United States Patent
Wiesener et al.

(10) Patent No.: US 6,735,900 B2
(45) Date of Patent: May 18, 2004

(54) BAIT STATION FOR RODENTS, IN PARTICULAR FOR RATS

(76) Inventors: Bernd Wiesener, Zeltinger Strasse 64, Berlin (DE), D-13465; Robert Wiesener, Edithstrasse 21, Hohen Neuendorf (DE), D-16540; Mark Wiesener, Knobelsdorffstrasse 2, Berlin (DE), D-14059

( * ) Notice: Subject to any disclaimer, the term of this patent is extended or adjusted under 35 U.S.C. 154(b) by 0 days.

(21) Appl. No.: 10/294,355

(22) Filed: Nov. 14, 2002

(65) Prior Publication Data

US 2003/0110680 A1 Jun. 19, 2003

(30) Foreign Application Priority Data

Nov. 25, 2001 (DE) .......................... 101 59 076

(51) Int. Cl.[7] ................................. A01M 1/20
(52) U.S. Cl. ......................................... 43/131
(58) Field of Search .................... 43/125, 124, 131, 43/132.1, 133

(56) References Cited

U.S. PATENT DOCUMENTS

| | | | | |
|---|---|---|---|---|
| 1,804,891 A | * | 5/1931 | Newman | 43/131 |
| 2,480,724 A | * | 8/1949 | Feussner | 43/131 |
| 2,532,681 A | * | 12/1950 | Stover | 43/131 |
| 2,664,663 A | * | 1/1954 | Mullen | 43/131 |
| 2,710,485 A | * | 6/1955 | Starr | 43/131 |
| 2,912,788 A | * | 11/1959 | Hargrove | 43/131 |
| 3,094,805 A | * | 6/1963 | Luck | 43/131 |
| 4,173,093 A | * | 11/1979 | Nakai | 43/121 |
| 4,349,981 A | * | 9/1982 | Sherman | 43/131 |
| 4,521,987 A | * | 6/1985 | Knote | 43/131 |
| 5,133,291 A | * | 7/1992 | Justice | 119/51.01 |
| 5,448,852 A | * | 9/1995 | Spragins et al. | 43/131 |
| 5,953,854 A | * | 9/1999 | Hyatt | 43/131 |

FOREIGN PATENT DOCUMENTS

| | | | |
|---|---|---|---|
| DE | 1678502 | 5/1954 | |
| DE | 7440901 | 4/1975 | |
| DE | 9406730 | 8/1994 | |
| DE | 19612883 | 10/1997 | |
| FR | 2556562 A2 | * 6/1985 | .......... A01M/25/00 |
| GB | 442190 A1 | * 12/1990 | .......... A01M/25/00 |

* cited by examiner

Primary Examiner—Peter M. Poon
Assistant Examiner—Joan M. Olszewski
(74) Attorney, Agent, or Firm—Notaro & Michalds P.C.

(57) ABSTRACT

The invention relates to a bait station for rodents, in particular for rats, with a box, entry and exit holes in the vicinity of the box floor and run areas extending in the box between the latter for rodents. The aim is to construct such a bait station such that when in the ready position the run areas for the rodents in the box are accepted more quickly and less timidly. For this purpose when the bait station is in the ready position the zones of the box floor of the bait station corresponding to the run areas are left open and the run areas for the rodents run in the box of the bait station on the floor of the surroundings of the area of use of the bait station.

2 Claims, 2 Drawing Sheets

BAIT STATION FOR RODENTS, IN PARTICULAR FOR RATS

FIELD AND BACKGROUND OF THE INVENTION

This invention relates to a box-like bait station for rodents, in particular for rats, having outer walls, a floor and a lid, entry and exit holes in the vicinity of the floor, run areas for the rodents extending in the box between the latter and with areas for bait presentation.

In conventional such bait stations for rodents, in particular for rats, the floor of the box of the bait station extends over the entire box plan when in the ready position, so that after the rodents enter the bait station through the entry hole near the floor they advance towards the bait usually very timidly on the smooth box floor e.g. made of synthetic material on the run areas, and the time required for the eradication measures of the bait station is relatively long.

SUMMARY OF THE INVENTION

The invention is based on the observation that rodents, in particular rats considered to be intelligent, "prefer", to run, in other words fearlessly, on the floor of the familiar surroundings and thus preferably on natural types of floor, rather than on unknown and possibly smooth synthetic floors.

The object of the invention therefore is to provide a box-like bait station for rodents, in particular for rats, in which the run areas for the rodents in the box of the bait station are accepted more quickly in their ready position and without the rodents being timid, and which provides considerable shortening of the time required for eradication measures.

This task is solved according to the present invention in that when the bait station is in the ready position the zones of the box floor of the bait station corresponding to the run areas are left open and the run areas for the rodents in the box of the bait station run on the floor of the surroundings, e.g. on the natural floor of the surroundings of the area of use of the bait station.

The zones of the box floor of the bait station, which correspond to its run areas for the rodents, are preferably already recessed during manufacture or the zones of the box floor of the bait station, which correspond to its run areas for the rodents, are mounted along perforations, material thinning lines, at predetermined breaking points or dividing segments in the box floor and can be separated therefrom.

The inner and outer forming of the box of the bait station can be done in any shape. The box of the bait station can preferably be manufactured by injection moulding or deep drawing methods from synthetic material, or may comprise metal, in particular light metal.

When it is in the ready position the bait station according to the present invention is accepted more readily by presenting the run areas in the box of the bait station on a floor familiar to rodents, in particular rats, and without their being timid, whereby eradication measures are considerably shortened and the efficiency of the bait station is substantially increased.

BRIEF DESCRIPTION OF THE DRAWINGS

Exemplary embodiments of the bait station according to the present invention will now be described with reference to the drawings, in which.

DESCRIPTION OF THE PREFERRED EMBODIMENT

Figure 1:
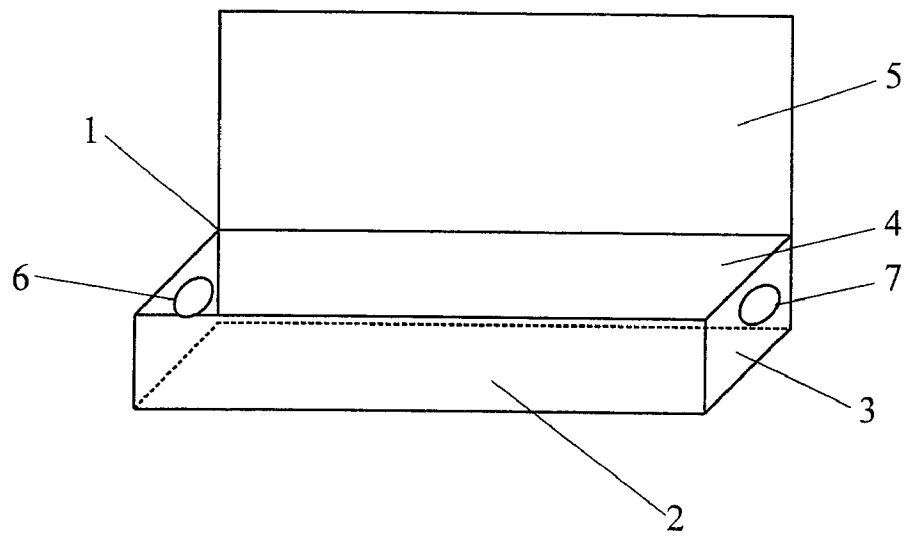
FIG. 1 is a schematic perspective view, seen from top right, of a box-like box of the bait station for rodents, in particular for rats, with open lid.

FIG. 1 is a schematic perspective view of a box-like box 1 of a bait station, viewed from top right, with a floor 2, outer wall parts 3 and 4 and a lid 5 in the open position. Provided in the outer wall parts 3 is an entry hole 6 or an exit hole 7 in the vicinity of the floor centre with at least some outer wall 3 left around the entire hole in each case as shown.

Figure 2:
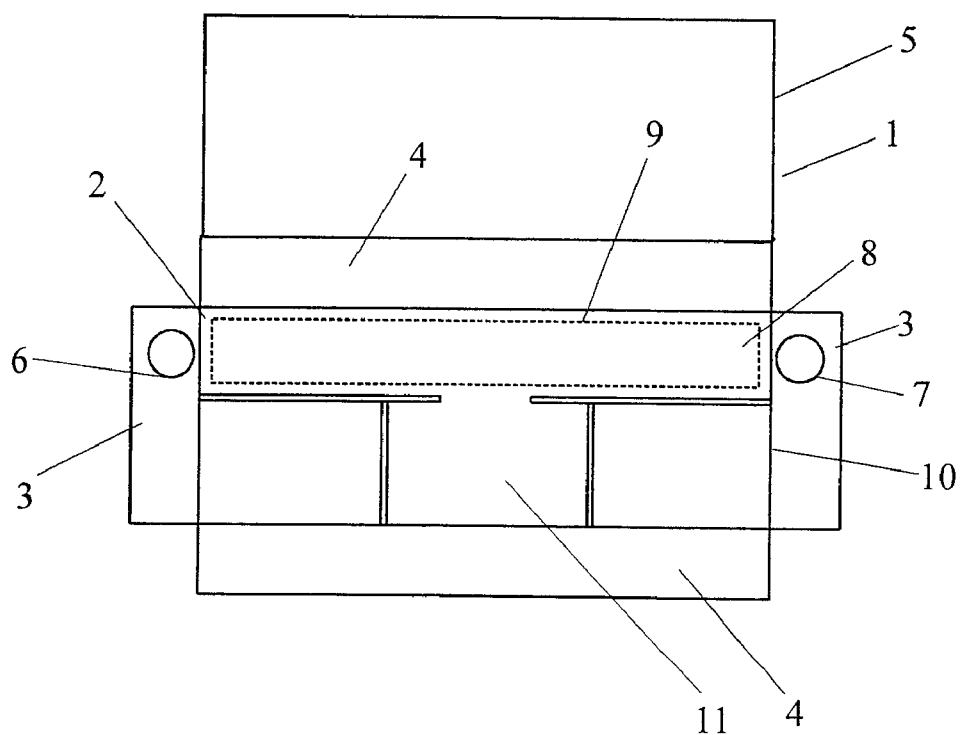
FIG. 2 is a schematic plan of the box-like box of the bait station laid out in a plane according to FIG. 1 by way of illustration.

As further shown in FIG. 2, which diagrammatically depicts the plan of the box-like box 1 of the bait station laid out in a plane according to FIG. 1 for illustration purposes, a zone 8 representing a run area of the floor 2, which is mounted by a perforation 9 in the floor 2 and can be separated therefrom, extends between the entry hole 6 and the exit hole 7. The remaining part 10 of the floor 2 extending parallel to the separable zone 8 embodies bait presentation areas 11. With the bait station in the ready position the zone 8 of the floor 2 of the box 1 of the bait station corresponding to the run area for the rodents is separated from the floor 2, and the run area is formed by the floor of the surroundings of the area of use of the bait station, e.g. by the natural ground itself. This effectively ensures that rodents, which run into the box 1 through the entry or exit hole 6 or 7, make their way in the direction of the bait presentation areas 11 without being timid, since the rodents are being offered the run on a floor familiar to them in the box 1.

Figure 3:
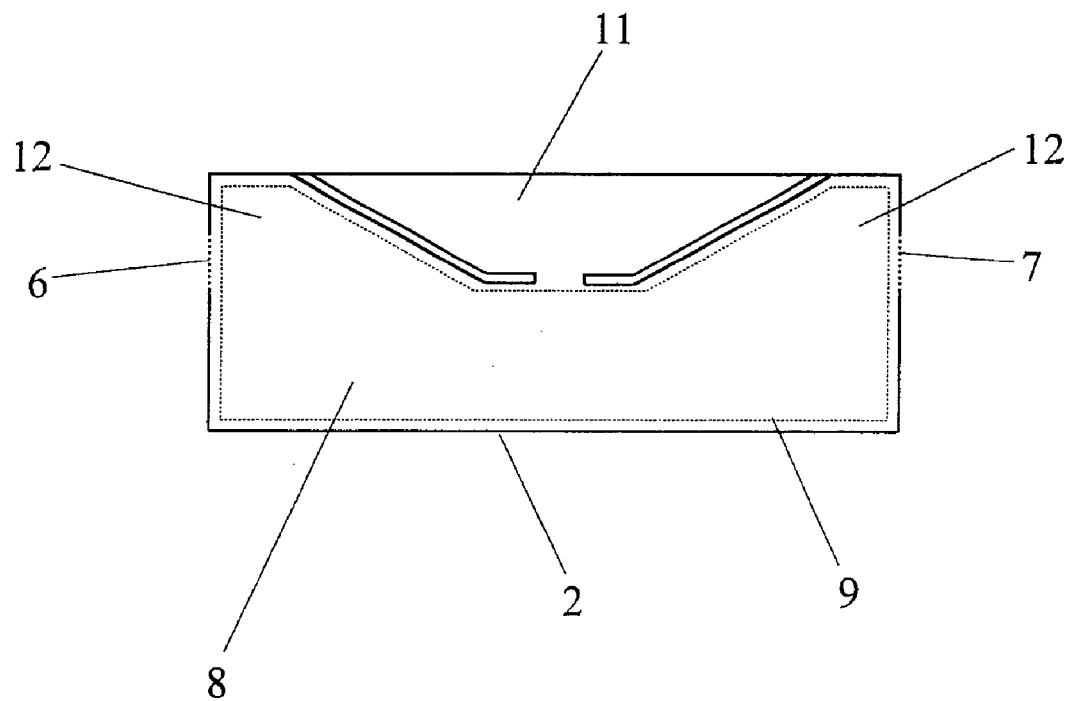
FIG. 3 is a schematic plan view of the box floor of another embodiment of the bait station, whereby the shape of the run areas and of the bait area is different in shape to its shape visible in FIG. 2.

FIG. 3 schematically illustrates the plan of the floor 2 of the box of another embodiment of the bait station with a modified orientation of the zone 8 separable from the floor 2, which corresponds to the run area with the bait station in the ready position, and of the bait presentation area 11 of the bait station, whereby the entry hole 6 and the exit hole 7 are arranged opposite one another in corner regions 12 of the box, covered in the vicinity of the floor.

| List of reference numbers: | |
|---|---|
| 1 | Box |
| 2 | box floor |
| 3 | outer wall parts |
| 4 | outer wall parts |
| 5 | box lid |
| 6 | entry hole |
| 7 | exit hole |
| 8 | separable floor zone |
| 9 | perforations |
| 10 | floor section |
| 10 | bait presentation area |
| 11 | bait retention area |
| 12 | corner regions of the floor |

What is claimed is:

1. A box-like bait station for rodents, the bait station being adapted to be placed on a surface over which rodents are expected to run, the bait station comprising: a plurality of outer walls, a box floor adapted to lay directly on the surface over which rodents are expected to run, and a lid together with the outer walls and box floor defining an enclosure to be placed on the surface over which rodents are expected to run, the outer walls containing entry and exit holes for rodents, at least some of the respective outer wall extending entirely around both of the entry and exit holes and each hole being in the vicinity of the box floor, with a rodent run area extending in the box, along the box floor and between the entry and exit holes for rodents, the enclosure including at least one area for bait presentation on the box floor and spaced from but communicating with the run area, and a perforation (9) in the box floor, defining a run area zone (8) of the box floor (2) that is left open when the perforation is cut to separate the run area zone from a remainder of the box floor to expose the surface over which rodents are expected to run so that rodents running along the surface outside the bait station and entering the entry hole into the enclosure, run along the same surface along the run area zone in the enclosure, and with at least some box floor extending entirely around the run area zone in the run area.

2. A box-like bait station for rodents, the bait station being adapted to be placed on a surface over which rodents are expected to run, the bait station comprising: a plurality of outer walls, a box floor adapted to lay directly on the surface over which rodents are expected to run, and a lid together with the outer walls and box floor defining an enclosure to be placed on the surface over which rodents are expected to run, the outer walls containing entry and exit holes for rodents, at least some of the respective outer wall extending entirely around both of the entry and exit holes and each hole being in the vicinity of the box floor, with a rodent run area extending in the box, along the box floor and between the entry and exit holes for rodents, the enclosure including at least one area for bait presentation on the box floor and spaced from but communicating with the run area, the box floor (2) having a run area zone (8) that is left open and which is surrounded by a remainder of the box floor to expose the surface over which rodents are expected to run so that rodents running along the surface outside the bait station and entering the entry hole into the enclosure, run along the same surface along the run area zone in the enclosure, and with at least some box floor extending entirely around the run area zone in the run area.

* * * * *